United States Patent [19]

Buchanan et al.

[11] 4,283,228
[45] Aug. 11, 1981

[54] LOW TEMPERATURE DENSIFICATION OF PZT CERAMICS

[75] Inventors: Relva C. Buchanan; Dale E. Wittmer, both of Champaign, Ill.

[73] Assignee: University of Illinois Foundation, Urbana, Ill.

[21] Appl. No.: 100,340

[22] Filed: Dec. 5, 1979

[51] Int. Cl.³ .................. C04B 35/46; C04B 35/48
[52] U.S. Cl. ........................... 106/73.3; 252/62.9
[58] Field of Search ............. 106/73.3; 252/62.9; 264/65

[56] References Cited

U.S. PATENT DOCUMENTS

| | | | |
|---|---|---|---|
| 3,502,913 | 3/1970 | Osada | 252/62.9 |
| 3,532,628 | 10/1970 | Watanabe et al. | 252/62.9 |
| 3,654,160 | 4/1972 | Ohno et al. | 252/62.9 |
| 3,963,630 | 6/1976 | Yonezawa | 106/73.3 |
| 4,152,280 | 5/1979 | Arendt et al. | 106/73.3 |

*Primary Examiner*—Earl C. Thomas
*Assistant Examiner*—Mark Bell
*Attorney, Agent, or Firm*—Mathew L. Kalinowski

[57] ABSTRACT

Addition of from about 0.1 to about 6.0% by weight of $V_2O_5$ to (PZT) lead zirconate-lead titanate powder promotes rapid densification at temperatures below 1000° C. and eliminates the need for PbO atmosphere control. Densification to greater than 98% of theoretical density is achieved with firing times as short as 1–5 minutes. Dielectric properties depend upon the amount of $V_2O_5$ added and upon the microstructure developed, but in general are equivalent to those reported for conventional PZT compositions.

6 Claims, 2 Drawing Figures

LOW TEMPERATURE DENSIFICATION OF PZT CERAMICS

This invention was made prior to but developed under a grant from the Office of Naval Research, Department of the Navy.

This invention relates to densified (PZT)lead zirconate-lead titanate ceramic compositions and to a process for densifying such compositions with the aid of a $V_2O_5$ promoter.

PZT ceramics are well known and have found wide use as transducers, capacitors, and sensors in the electronic-ceramic industry. Such ceramics are conventionally prepared by sintering a PZT powder at a temperature of from about 1200° to about 1350° C. for about four or more hours. Control of the atmosphere is critical because of the PbO volatility at these temperatures. Typically, packing powders or pellets containing excess PbO are used to maintain a known PbO vapor pressure around the PZT ceramic during sintering. Despite these measures, the stoichiometry of the ceramic composition remains difficult to control because of the high volatility of the PbO at the sintering temperatures employed. Furthermore, temperatures required to obtain densities greater than 90% of theoretical are reported to be in the neighborhood of about 1250°–1300° C.

Accordingly, it is an object of this invention to rapidly densify PZT ceramics at temperatures low enough to eliminate the need for a protective PbO atmosphere.

Another object of this invention is to rapidly densify PZT ceramics at low temperatures to a density of at least 98% of theoretical with the aid of a $V_2O_5$ promoter without adversely affecting electrical characteristics.

Still another object is to provide greater control of the stoichiometry and microstructure of the PZT composition.

A further object is to provide economies in the processing of PZT ceramics by virtue of lower sintering temperatures, shorter sintering times, and shorter overall processing times.

These and other objects will become apparent as description of the invention proceeds.

It has now been found that addition of from about 0.1 to about 6.0%, preferably from about 0.25 to about 1.0% by weight of $V_2O_5$ to a PZT powder promotes rapid densification at temperatures below 1000° C. without the need for maintaining a protective PbO atmosphere. Density of greater than 98% of theoretical is achieved with sintering temperatures in the range of about 860° to about 975° C. and with sintering times of from about 1 to about 120 minutes. Stoichiometry is controlled by virtue of lower PbO vapor pressure at the lower sintering temperatures. Grain size and grain size distribution are controlled by starting with the appropriate grain size powder and sintering, for example, at 950° C. for 15 minutes, or by sintering at lower temperatures for longer times.

The $V_2O_5$-promoted PZT powder for use in this invention is suitably prepared by coprecipitation of electronic grade PbO, $V_2O_5$, zirconium-n-butylate, and tetra-n-butyl titanate. The coprecipitate is calcined and sized to pass a 100-mesh screen before sintering. Commercially available PZT powders, or powders prepared by other conventional processes, blended with $V_2O_5$ can also be used to advantage in the practice of this invention. Suitable PZT powders typically have the formula $Pb(ZrTi)O_3$ wherein the Zr:Ti molar ratio ranges from about 65:35 to about 35:65. Minor quantities of other materials, for example oxides of lanthanum, niobium, or iron, can be included in the PZT formulation.

The $V_2O_5$ promoter can be added as $V_2O_5$ or as a derivative that affords $V_2O_5$ during processing such as ammonium vanadate or vanadyl salts. The $V_2O_5$ promoter can be added during the preparation of the PZT powder or it can be blended and milled with the preprepared or pre-calcined powder.

The PZT-$V_2O_5$ mixture is then formed, for example into discs, pressed at 5000–30,000 psi, and sintered in air at the temperatures and for the times indicated above. The dielectric and piezoelectric properties of the ceramic so obtained are equivalent to, and in some formulations superior to, those reported for conventional PZT compositions.

DESCRIPTION OF THE PREFERRED EMBODIMENTS

The invention is further illustrated by reference to the following procedures and examples.

The preparation of PZT powders by the coprecipitation technique consisted of addition of electronic grade PbO and $V_2O_5$ to a blend of zirconium-n-butylate and tetra-n-butyl titanate. Precipitation was brought about by addition of an isopropyl alcohol-water mixture (2:1). After intimate blending, the mixtures were dried at room temperature and then at 150° C. After screening, the mixtures were calcined at about 550° C. for about 4 hours to drive off butylates and carbonaceous residue. The calcined powder was sized to pass a 100-mesh screen and then binder (1% PVA or 3% distilled water) was added by conventional dispersion techniques. Quantities of reagents were employed to provide a PZT composition having the formula $Pb(Zr_{0.53}Ti_{0.47})O_3$. This composition was chosen because of its proximity to the morphotropic phase boundary in the $PbZrO_3$-$PbTiO_3$ system, which is associated with high coupling coefficients, and because of the ready availability of comparative literature data. Quantities of $V_2O_5$ were included in the preparation to provide 0.1, 0.25, 0.50, 1.00, 1.50, 3.0, and 6.0% by weight of $V_2O_5$. Disc samples were pressed at 30,000±5000 psi and were then fired in air on a platinum foil at a temperature in the range of 890° to 1025° C. for from 1 to 120 minutes.

A control composition in which $V_2O_5$ was omitted was prepared as above except that calcination was carried out at 875° C. for 1 hour, and sintering at 1280°–1300° C. for 4 hours in a protective PbO atmosphere.

Density determinations were made on sintered samples by the suspended weight technique in water and by bulk measurement.

Figure 1:
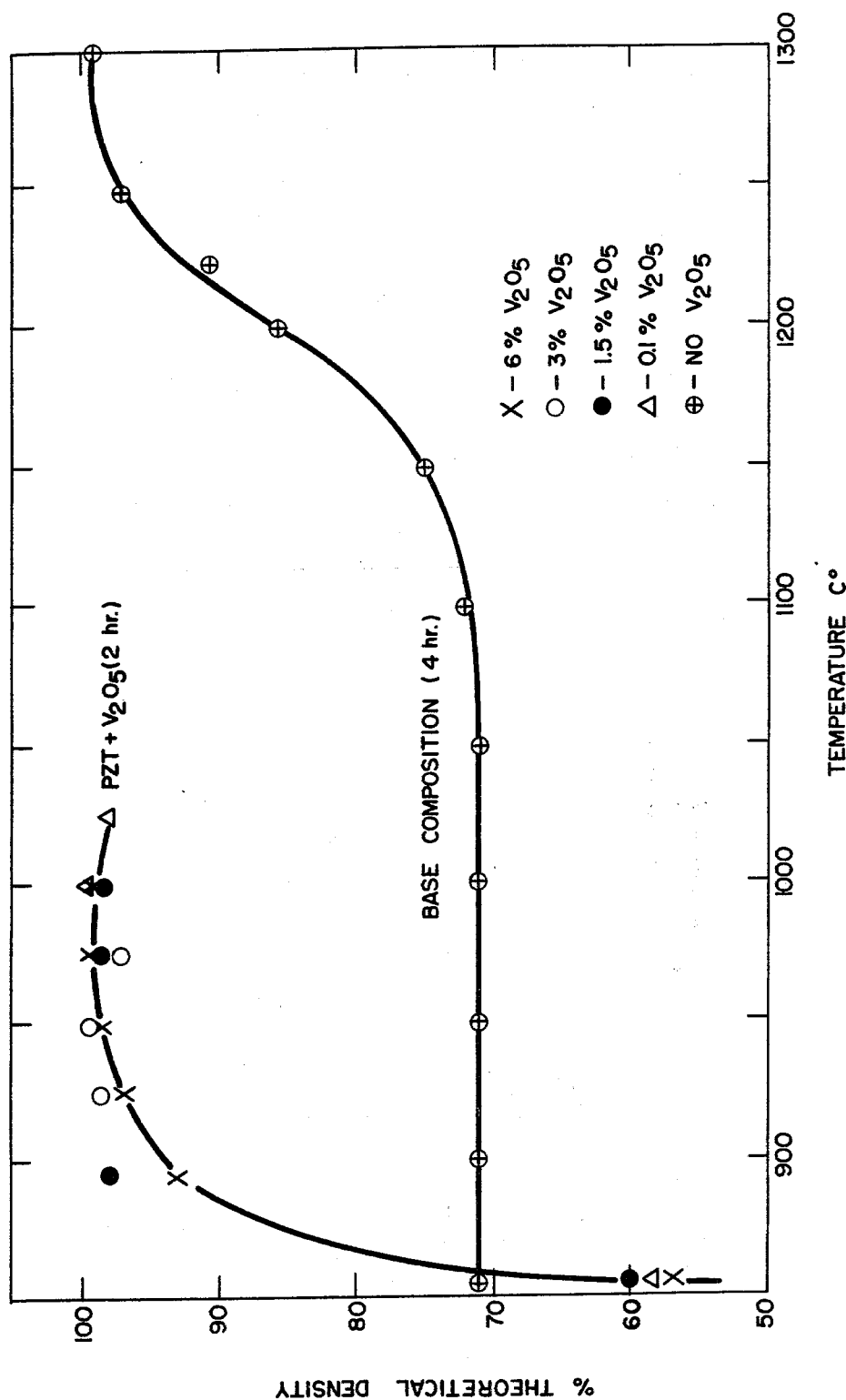
FIG. 1 illustrates the percent of theoretical density obtained as a function of temperature for PZT compositions promoted with various amounts of $V_2O_5$.

The data obtained are plotted in FIG. 1 to show percent theoretical density as a function of temperature. It is seen that for the $V_2O_5$-promoted compositions maximum density of greater than 98% was realized by sintering at a temperature of about 950° C. for about 120 minutes. In contrast, the control composition without $V_2O_5$ required sintering at 1280°–1300° C. for 4 hours to reach the same degree of densification.

TABLE I

| Composition | Electrical Properties of PZT (53:47) Ceramics | | | | | | |
|---|---|---|---|---|---|---|---|
| | | $V_2O_5$ wt. % | | | | | |
| Sintering Conditions | Base 1280° C./4hr | 0.25 | 0.50 | 1.0 960° C./2hrs. | 1.5 | 3.0 | 6.0 |
| Dielectric Constant | 750 | 1150 | 1100 | 1030 | 720 | 220 | 160 |
| % Dissipation Factor | 1.5 | 1.45 | 1.15 | 0.90 | 1.04 | 0.8 | 0.5 |
| $d_{33} \times 10^{-12}$ C/N | 160 | 147 | 144 | 140 | 130 | not poled | |
| P(300° C.) (ohm-cm) | $1.6 \times 10^6$ | $5.0 \times 10^7$ | $2.3 \times 10^7$ | $1.5 \times 10^7$ | $5.6 \times 10^6$ | $3.7 \times 10^6$ | $1.2 \times 10^5$ |

Figure 2:
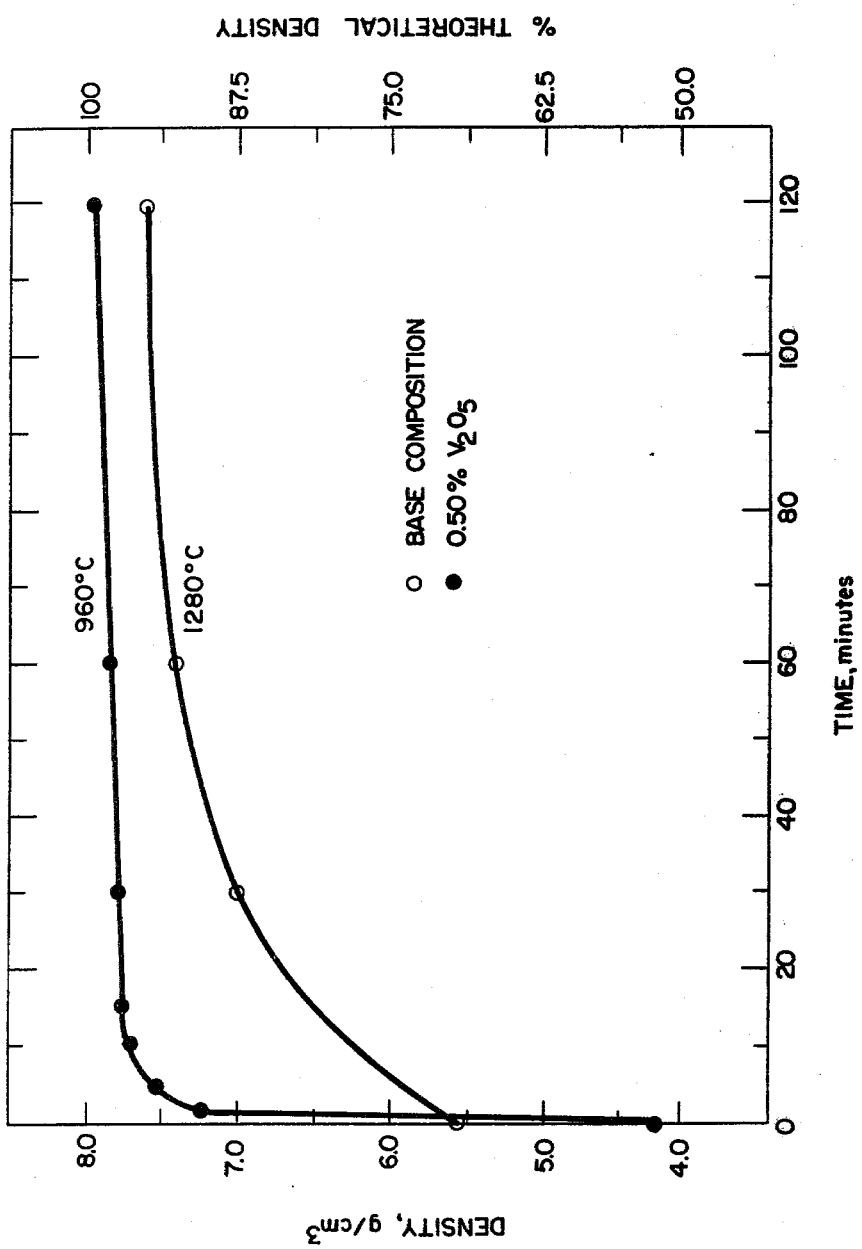
FIG. 2 illustrates the acceleration of densification with $V_2O_5$ addition.

The data obtained are also plotted in FIG. 2 to show the acceleration of densification that can be realized with $V_2O_5$ addition. It is seen that the PZT composition containing 0.5% $V_2O_5$ sintered at 960° C. reached greater than 90% density in about 5 minutes and greater than 98% density in less than 60 minutes. In contrast, the control composition required a sintering time of about 60 minutes at a temperature of 1280° C. to reach 90% density which value rose only slowly with sintering for an additional 60 minutes.

The use of $V_2O_5$ as a sintering aid was equally effective with commercially available PZT powders. For example, a commercial PZT powder having a Zr:Ti molar ratio of 53:47 was milled and blended with 1.0% by weight of $V_2O_5$ with the use of isopropyl alcohol as a dispersant. After drying, screening, and pressing (15,000 psi), the ceramic compacts were fired to greater than 98% density at 950° C. for 120 minutes. To reach the same density, this PZT powder without added $V_2O_5$ required a firing temperature of 1230° C. for 4 hours in a protective PbO environment.

Evaluation of the electrical characteristics of typical ceramic compositions prepared according to the method of this invention included measurement of dielectric constant and dissipation factor at 25° C., at 1 KHz and 0.3 volts RMS; measurement of D.C. resistivity between 25° and 400° C. at 10 volts; and measurement of piezoelectric properties with a piezometer at 25° C. The results obtained are listed in Table I. It is seen that addition of up to 1.5% by weight of $V_2O_5$ afforded a significant improvement in properties. Addition of $V_2O_5$ in amounts greater than 1.5% resulted in a reduction in dielectric constant and dissipation factor but voltage and frequency stability were improved.

Although this invention has been described with particular reference to certain preferred embodiments thereof, it is understood that variations and modifications can be effected within the spirit and scope of the appended claims. It is intended that all matter contained in the above description, figures, and table shall be interpreted in an illustrative and not in a limiting sense.

What is claimed is:

1. A fired PZT ceramic composition characterized by a density of at least 98% of theoretical density which composition consists essentially of a major amount of lead zirconate-lead titanate having the formula $Pb(ZrTi)O_3$ wherein the Zr:Ti molar ratio ranges from about 65:35 to about 35:65, and from about 0.1 to about 6.0% by weight of $V_2O_5$.

2. The composition of claim 1 wherein the lead zirconate-lead titanate is $Pb(Zr_{0.53}Ti_{0.47})O_3$ and the $V_2O_5$ content ranges from about 0.1 to about 1.5% by weight.

3. The composition of claim 1 prepared by the process of milling and blending a lead zirconate-lead titanate having the formula $Pb(ZrTi)O_3$, wherein the Zr:Ti molar ratio ranges from about 65:35 to about 35:65, with from about 0.1 to about 6.0% by weight of a $V_2O_5$-affording promoter, pressing, and firing the blended powder in air at a temperature in the range of from about 860° to about 975° C. for a time sufficient to reach a density of at least 98% of theoretical density.

4. The composition of claim 3 wherein the lead zirconate-lead titanate is $Pb(Zr_{0.53}Ti_{0.47})O_3$ and the $V_2O_5$-affording promoter is $V_2O_5$ utilized in amounts ranging from about 0.1 to about 1.5% by weight.

5. A process for preparing PZT ceramic compositions characterized by a density of at least 98% of theoretical density comprising the steps of milling and blending a lead zirconate-lead titanate powder having the formula $Pb(ZrTi)O_3$, wherein the Zr:Ti molar ratio ranges from about 65:35 to about 35:65, with from about 0.1 to about 6.0% by weight of a $V_2O_5$-affording promoter, pressing, and firing the blended powder in air at a temperature of from about 860° to about 975° C. for from about 1 to about 120 minutes.

6. The process of claim 5 wherein the lead zirconate-lead titanate is $Pb(Zr_{0.53}Ti_{0.47})O_3$ and the $V_2O_5$-affording promoter is $V_2O_5$ utilized in amounts ranging from about 0.1 to about 1.5% by weight.

* * * * *